United States Patent
Matzek et al.

(10) Patent No.: US 9,973,432 B2
(45) Date of Patent: *May 15, 2018

(54) LOAD BALANCING IN A VIRTUALIZED COMPUTING ENVIRONMENT BASED ON A FABRIC LIMIT

(71) Applicant: International Business Machines Corporation, Armonk, NY (US)

(72) Inventors: Samuel D. Matzek, Rochester, MN (US); Jeffrey W. Tenner, Rochester, MN (US); Gerald F. McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/796,662

(22) Filed: Jul. 10, 2015

(65) Prior Publication Data

US 2017/0012904 A1  Jan. 12, 2017

(51) Int. Cl.
*H04L 12/931* (2013.01)
*H04L 12/803* (2013.01)
(Continued)

(52) U.S. Cl.
CPC ............ *H04L 47/125* (2013.01); *H04L 67/10* (2013.01); *H04L 67/1002* (2013.01); *H04L 67/1097* (2013.01); *H04L 41/5041* (2013.01)

(58) Field of Classification Search
CPC ... H04L 47/125; H04L 67/1097; H04L 67/10; H04L 67/1002; H04L 49/505; H04L 49/70; H04L 49/5041
See application file for complete search history.

(56) References Cited

U.S. PATENT DOCUMENTS

| 7,522,529 B2 | 4/2009 | Dropps et al. |
| 7,603,670 B1 | 10/2009 | van Rietschote |

(Continued)

FOREIGN PATENT DOCUMENTS

| CN | 103929367 A | 7/2014 |
| CN | 104750427 A | 7/2015 |

OTHER PUBLICATIONS

List of IBM Patents or Patent Applications Treated As Related.
(Continued)

*Primary Examiner* — Brian J Gillis
*Assistant Examiner* — Steve Lin
(74) *Attorney, Agent, or Firm* — Middleton Reutlinger

(57) ABSTRACT

An apparatus and program product manage virtual machines in a virtualized computing environment based at least in part on limitations associated with storage fabrics through which virtual machines may access one or more storage systems in such an environment. The storage fabric limitations may be used, for example, in connection with placing virtual machines on hosts in a virtualized computing environment. As another example, storage fabric limitations may be used in connection with deploying virtual machines into a virtualized computing environment to reduce the likelihood of boot errors. As still another example, storage fabric limitations may be used in connection with load balancing across multiple fabrics in a virtualized computing environment.

16 Claims, 6 Drawing Sheets

(51) Int. Cl.
 *H04L 29/08* (2006.01)
 *H04L 12/24* (2006.01)

(56) References Cited

U.S. PATENT DOCUMENTS

| | | | |
|---|---|---|---|
| 7,773,521 B2 | 8/2010 | Zhang et al. | |
| 8,619,574 B2 | 12/2013 | Dang et al. | |
| 8,661,518 B2* | 2/2014 | Doddapaneni | H04L 49/357 726/9 |
| 8,737,230 B2* | 5/2014 | Kanda | H04L 47/10 370/237 |
| 9,450,877 B1* | 9/2016 | Kamisetty | H04L 47/125 |
| 9,692,729 B1* | 6/2017 | Chen | H04L 63/0272 |
| 9,742,697 B2 | 8/2017 | Tripathi et al. | |
| 2003/0142628 A1* | 7/2003 | Alonso | H04L 29/06 370/241 |
| 2008/0059602 A1* | 3/2008 | Matsuda | G06F 3/0613 709/212 |
| 2008/0250178 A1* | 10/2008 | Haustein | H04L 47/10 710/107 |
| 2009/0307330 A1* | 12/2009 | Allen | G06F 9/45558 709/216 |
| 2010/0153945 A1 | 6/2010 | Bansal et al. | |
| 2010/0262974 A1* | 10/2010 | Uyeda | G06F 9/4856 718/105 |
| 2012/0087242 A1* | 4/2012 | Dang | H04L 49/357 370/235 |
| 2013/0297964 A1 | 11/2013 | Hegdal et al. | |
| 2014/0173060 A1 | 6/2014 | Jubran et al. | |
| 2014/0359556 A1 | 12/2014 | Jujare et al. | |
| 2015/0006705 A1* | 1/2015 | Antony | H04L 43/0882 709/224 |
| 2015/0052254 A1* | 2/2015 | Zhao | H04L 67/101 709/226 |
| 2015/0188839 A1 | 7/2015 | Zhang | |
| 2015/0318986 A1 | 11/2015 | Novak et al. | |
| 2015/0381435 A1 | 12/2015 | Todd et al. | |
| 2016/0112347 A1 | 4/2016 | Kollu et al. | |
| 2016/0182449 A1* | 6/2016 | Varghese | H04L 63/0281 726/12 |
| 2016/0226794 A1 | 8/2016 | Rao | |

OTHER PUBLICATIONS

U.S. Patent and Trademark Office, Office Action issued in related U.S. Appl. No. 14/839,651 dated Apr. 14, 2017.
International Search Report and Written Opinion for PCT/IB2016/053959 dated Oct. 13, 2016.
U.S. Patent and Trademark Office, Office Action issued in related U.S. Appl. No. 14/796,587 dated Jun. 26, 2017.
U.S. Patent and Trademark Office, Office Action issued in related U.S. Appl. No. 14/839,671 dated Jul. 27, 2017.
U.S. Patent and Trademark Office, Office Action issued in related U.S. Appl. No. 14/796,640 dated Aug. 8, 2017.
U.S. Patent and Trademark Office, Office Action issued in related U.S. Appl. No. 14/839,624 dated Oct. 5, 2017.
U.S. Patent and Trademark Office, Notice of Allowance issued in related U.S. Appl. No. 14/796,640 dated Dec. 1, 2017.
U.S. Patent and Trademark Office, Notice of Allowance issued in related U.S. Appl. No. 14/839,624 dated Dec. 1, 2017.
U.S. Patent and Trademark Office, Final Office Action issued in related U.S. Appl. No. 14/839,651 dated Sep. 6, 2017.

* cited by examiner

LOAD BALANCING IN A VIRTUALIZED COMPUTING ENVIRONMENT BASED ON A FABRIC LIMIT

FIELD OF THE INVENTION

The invention is generally related to computers and computer software, and in particular, to logically-partitioned and virtualized computing environments.

BACKGROUND OF THE INVENTION

Computing technology has advanced at a remarkable pace, with each subsequent generation of computing system increasing in performance, functionality, and storage capacity, often at reduced cost. In addition, workload allocation of computing and other hardware resources is often employed to maximize the utilization of hardware resources such as processors, memories, networks, storage devices, etc., and thereby reduce the overall costs necessary for supporting a desired workload capacity. Optimizing workload allocation can also have a positive impact on power costs and environmental concerns due to a reduction in the amount of hardware resources required to support a given workload.

Many computer systems employ virtualization, also referred to as logical partitioning, which enables a computer be utilized to run several operating environments, or operating systems, at once. In a typical embodiment, a single physical computer or data processing system can run a plurality of operating systems in a corresponding plurality of virtual machines (VMs), also referred to as logical partitions (VMs). Each operating system resides in its own virtual machine, with each virtual machine allocated a part of a physical processor, an entire physical processor, or multiple physical processors from the computer. Additionally, a portion of the computer's memory may be allocated to each virtual machine. An underlying partition manager, often referred to as a hypervisor or virtual machine monitor (VMM), manages and controls the virtual machines. The hypervisor is typically a part of the system firmware and manages the allocation of resources to the operating systems and virtual machines. As such, one physical computer may run one or more virtual machines and thus virtualize the underlying hardware resources used by the applications, operating systems, and other program code configured to operate in those virtual machines.

Virtualization is increasingly used in data centers and cloud computing applications, which may provide for cost efficiencies through elastic computing, whereby hardware resources are provisioned and de-provisioned based on workload changes. In such applications, individual workloads may change over time, and as such virtualization may be employed to effectively multiplex hardware resources over multiple workloads to provide an overall greater resource utilization. In order to balance costs, an assumption may be made that not all workloads will run with maximum resource requirements at the same time, so fewer hardware resources than the sum of all maximum resource requirements for workloads may be allocated for a given set of workflows, resulting in the hardware resources being overcommitted. As one example, a cloud provider may allocate more virtual processors (CPUs) across multiple virtual machines on a particular host computer under the assumption that some of the virtual machines will only run at off-peak hours when other virtual machines are shut down or otherwise deactivated.

Some data centers and cloud computing applications may also support the virtualization of other types of hardware resources, such as storage devices and networks, which may enable virtual machines to access virtual networks and/or storage devices, and with the particulars of the underlying hardware supporting such virtual entities managed in a manner that is effectively hidden from the virtual machines. The allocation of such hardware resources to virtual machines may also impact performance and efficiency, as overloading networks and/or storage devices can lead to slow response times, and in some instances, to an inability of a virtual machine to connect to an underlying hardware resource.

SUMMARY OF THE INVENTION

The invention addresses these and other problems associated with the prior art by providing an apparatus and program product that manage virtual machines in a virtualized computing environment based at least in part on limitations associated with storage fabrics through which virtual machines may access one or more storage systems in such an environment. The storage fabric limitations, referred to herein as fabric limits, may be used, for example, in connection with placing virtual machines on hosts in a virtualized computing environment. As another example, fabric limits may be used in connection with deploying virtual machines into a virtualized computing environment to reduce the likelihood of boot errors. As still another example, fabric limits may be used in connection with load balancing across multiple fabrics in a virtualized computing environment.

Therefore, consistent with one aspect of the invention, load balancing is performed in a computing environment of the type including a plurality of fabrics coupling a plurality of hosts to one or more storage systems by determining a fabric limit for a limited fabric resource of each of the plurality of fabrics, determining an allocation of the limited fabric resource for each of the plurality of fabrics, and balancing utilization of the limited fabric resource across the plurality of fabrics using at least one processor based at least in part upon the determined fabric limits and determined allocations of the limited fabric resource for the plurality of fabrics, where balancing utilization of the limited fabric resource includes migrating at least one virtual machine that utilizes a first fabric among the plurality of fabrics to use a second fabric among the plurality of fabrics.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1A:
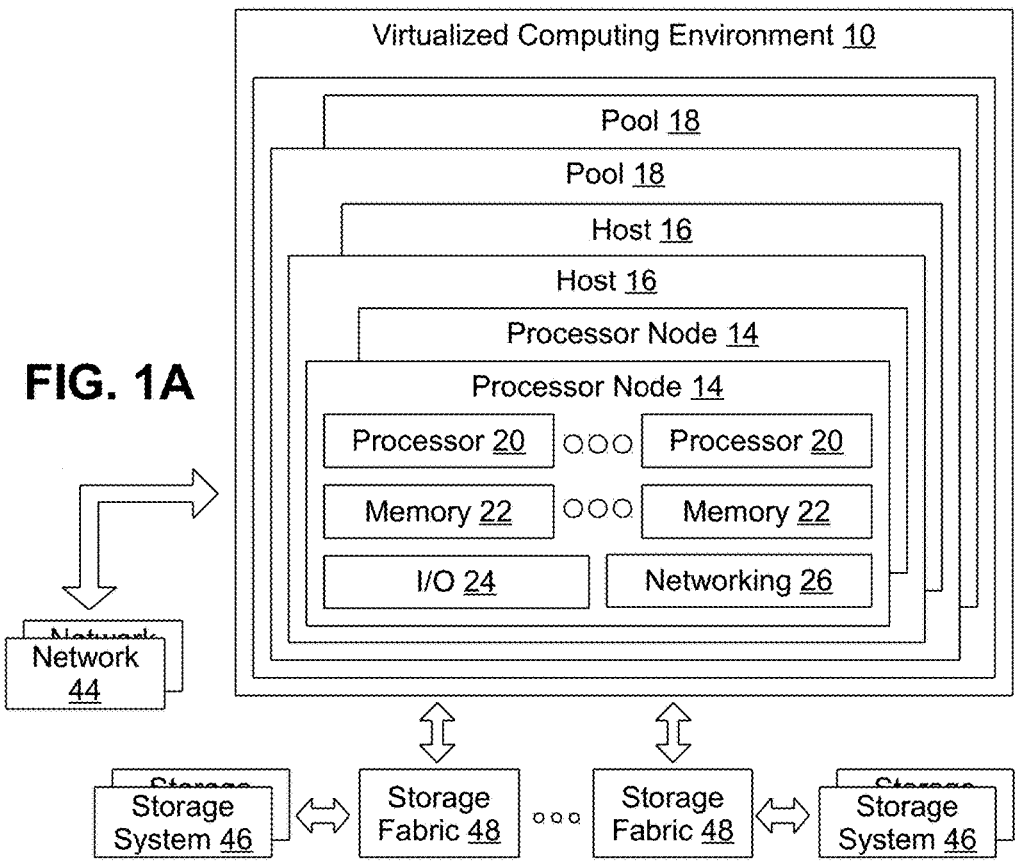
FIGS. 1A and 1B are block diagrams of an example hardware (FIG. 1A) and software (FIG. 1B) environment suitable for implementing a virtualized computing environment consistent with the invention.

Embodiments consistent with the invention may manage virtualization in a virtualized or logically-partitioned computing environment of the type including one or more fabrics coupling a plurality of hosts to one or more storage systems based in part on a fabric limit for a limited fabric resource such as an active fabric login limit.

A virtualized or logically-partitioned computing environment, in this regard, may be considered to include one or more computers or data processing systems supporting logical partitioning or virtualization, with at least some of the data processing systems incorporating one or more processor nodes representing hardware resources capable of hosting one or more virtual machines. A host, in this regard, may therefore be considered to include any subset of the available hardware resources in a data processing system capable of hosting a virtual machine, and generally, though not necessarily, includes one or more processors, one or more memory devices, and in some instances additional hardware resources such as input/output (I/O) resources, network resources, or other types of resources capable of being allocated to a virtual machine. Hosts in some embodiments may be implemented as multi-chip modules, circuit boards or cards, books, drawers, racks, slots, chassis, or even combinations thereof. Hosts may also be self-contained computer systems and/or multiple networked computer systems in some embodiments. Furthermore, hosts may be nested in some embodiments. In general, any combination of hardware resources in a virtualized computing environment capable of hosting a virtual machine may be considered a host for the purposes of the disclosure herein.

In addition, a virtualized computing environment in the illustrated embodiments includes one or more storage systems accessible via one or more storage fabrics. A storage system may include one or more storage devices upon which data may be stored and/or retrieved by a virtual machine, while a storage fabric may be considered to incorporate one or more networks, buses, or other communication links coupling one or more data processing systems with one or more storage systems. Further, a storage fabric may also include one or more hardware components capable of arbitrating access to a storage system or otherwise routing communications between data processing systems and storage systems, e.g., one or more network switches.

In the illustrated embodiment discussed hereinafter, a storage system and storage fabric may be collectively implemented using a Fibre Channel-based Storage Area Network (SAN), whereby the storage fabric may be implemented using a Fibre Channel Switched Fabric (FC-SW) topology incorporating one or more Fibre Channel-compatible switches. It will be appreciated, however, that other storage systems and/or storage fabrics may be used in other embodiments, as well as that multiple types of storage systems and/or storage fabrics may be incorporated into the same virtualized environment.

As noted above, in embodiments consistent with the invention, storage fabric limitations, referred to herein as fabric limits, may be used in connection with the placement, deployment and/or allocation of one or more virtual machines, such that the availability of limited fabric resources may be considered when making such decisions. A limited fabric resource, in this regard, may be considered to be related to the relative load and/or capacity of a storage fabric, and a fabric limit may be considered to be a limitation placed upon an associated limited fabric resource. In a Fibre Channel-based SAN, for example, a limited fabric resource may be an active login to a fabric switch, and a fabric limit may be an active fabric login limit for a fabric switch, e.g., limits on active fabric logins (FLOGIs) and/or active fabric discoveries (FDISCs) in the case of N_Port ID Virtualization (NPIV). Other types of fabric limits may be associated with both Fibre Channel-based SANs as well as other types of storage fabrics, e.g., numbers of logins, numbers of virtual machines, numbers of accounts, zone limits such as numbers of zone members or numbers of zones, host limits such as numbers of hosts connected to a storage system, numbers of virtual storage area networks (VSANs) per physical fabric, numbers of host ports per storage system, maximum simultaneous IOs, etc.

As will also become more apparent below, in some embodiments a fabric limit may be modified or adjusted by a fabric overcommit parameter such as a fabric overcommit ratio and used to adjust a fabric capacity and thereby overcommit a limited fabric resource, e.g., a number of active fabric logins supported by a Fibre Channel switch.

Therefore, fabric limits may be used in some embodiments to assist in optimally placing virtual machines on hosts. In some embodiments, for example, virtualization in a computing environment of the type including one or more fabrics coupling a plurality of hosts to one or more storage systems may be managed by determining a fabric limit for a limited fabric resource of a first fabric among the one or more fabrics, determining an allocation of the limited fabric resource for the first fabric, and controlling placement of a virtual machine on a first host among the plurality of hosts using at least one processor based at least in part upon the determined fabric limit and determined allocation of the limited fabric resource for the first fabric.

In some embodiments, the fabric includes a Fibre Channel switch, and the fabric limit is an active Fabric Login (FLOGI) limit, an active Fabric Discovery (FDISC) limit, a zone limit, or a host limit. In addition, in some embodiments, the limited fabric resource comprises a fabric login for a storage switch in the first fabric, and the fabric limit comprises an active login limit of the storage switch. Further, in some embodiments, determining the fabric limit comprises querying the storage switch to retrieve the fabric limit, and in some embodiments, determining the allocation of the limited fabric resource comprises accessing the storage switch to retrieve a current allocation of fabric logins for the storage switch. In some embodiments, determining the allocation of the limited fabric resource comprises tracking active fabric logins in the computing environment, and some embodiments include determining an overcommitted fabric capacity for the first fabric from the fabric limit, where controlling placement of the virtual machine on the host is based at least in part on the determined overcommitted fabric capacity for the first fabric. In some embodiments, determining the overcommitted fabric capacity includes adjusting the fabric limit by a fabric overcommit ratio, while in some embodiments, setting the fabric overcommit ratio is performed in response to user input.

In some embodiments, controlling placement of the virtual machine on the first host includes determining a plurality of candidate host, fabric and storage system combinations from among the plurality of hosts, one or more fabrics and one or more storage systems, scoring each of the plurality of candidate host, fabric and storage system combinations based at least in part on the determined fabric limit and determined allocation of the limited fabric resource for the first fabric, and placing the virtual machine on the first host based upon a score of a first candidate host, fabric and storage system combination including the first host.

In some embodiments, scoring each of the plurality of candidate host, fabric and storage system combinations is further based at least in part on one or more of a host processor capacity, a host memory capacity, network capacity, or a storage system capacity, and in some embodiments, determining the plurality of candidate host, fabric and storage system combinations is based upon at least one requirement of the virtual machine. Some embodiments also include selecting an alternate fabric or alternate storage access technology for the virtual machine in response to determining a lack of capacity in the first fabric. Further, in some embodiments, controlling placement of the virtual machine on the first host includes deploying the virtual machine on the first host.

Furthermore, fabric limits may be used in connection with deploying virtual machines on hosts to reduce the likelihood of boot errors. In some embodiments, for example, a virtual machine may be deployed on a host in a computing environment of the type including a fabric coupling the host to a storage system, by, in response to initiation of a deployment of the virtual machine, and using at least one processor, determining, for a storage volume allocated for the virtual machine on the storage system, an allocation of a limited fabric resource of the fabric, determining, based upon the determined allocation, whether the fabric has capacity to boot the virtual machine, in response to determining that the fabric has sufficient capacity to boot the virtual machine, initiating a boot of the virtual machine on the host, and in response to determining that the fabric does not have sufficient capacity to boot the virtual machine, delaying the boot of the virtual machine on the host.

In some embodiments, the fabric includes a Fibre Channel switch, and the fabric limit is an active Fabric Login (FLOGI) limit, an active Fabric Discovery (FDISC) limit, a zone limit, or a host limit. Further, in some embodiments, determining whether the fabric has capacity to boot the virtual machine includes determining a fabric limit for the limited fabric resource, and in some embodiments, the limited fabric resource comprises a fabric login for a storage switch in the fabric, and the fabric limit comprises an active login limit of the storage switch. In some embodiments, determining the fabric limit comprises querying the storage switch to retrieve the fabric limit, and in some embodiments, determining the allocation of the limited fabric resource comprises accessing the storage switch to retrieve a current allocation of fabric logins for the storage switch.

In some embodiments, determining the allocation of the limited fabric resource comprises tracking active fabric logins in the computing environment, and in some embodiments, delaying the boot of the virtual machine on the host includes queuing the virtual machine, with such embodiments further including, after queuing the virtual machine, determining, for a storage volume allocated for the virtual machine on the storage system, whether the fabric has capacity to boot the queued virtual machine, and in response to determining that the fabric has capacity to boot the queued virtual machine, dequeuing the queued virtual machine and initiating the boot of the queued virtual machine on the host. In some embodiments, determining whether the fabric has capacity to boot the queued virtual machine, dequeuing the queued virtual machine and initiating the boot of the queued virtual machine on the host are performed by a monitor process. In some embodiments, the queued virtual machine is among a plurality of queued virtual machines, and such embodiments further include prioritizing an order of the plurality of queued virtual machines to be booted once the fabric has capacity to boot at least one of the plurality of queued virtual machines.

In some embodiments, the storage volume comprises a boot volume, and in some embodiments, the virtual machine further includes a data volume allocated thereto, and determining whether the fabric has capacity to boot the virtual machine further includes determining whether the fabric has capacity to connect the virtual machine to the data volume. In some embodiments, determining whether the fabric has capacity to boot the virtual machine further includes determining from a configuration setting whether boot of the virtual machine is permitted when the fabric does not have capacity to connect the virtual machine to the data volume, and in some embodiments, the host is among a plurality of a plurality of hosts in the computing environment, determining whether the fabric has capacity to boot the virtual machine is performed in response to an instruction to boot the virtual machine, and such embodiments further include, prior to the instruction to boot the virtual machine, placing the virtual machine on the host, creating the virtual machine, and copying an image for the virtual machine to the storage volume.

Fabric limits may also be used in connection with load balancing across fabrics. For example, in some embodiments, load balancing may be performed in a computing environment of the type including a plurality of fabrics coupling a plurality of hosts to one or more storage systems by determining a fabric limit for a limited fabric resource of each of the plurality of fabrics, determining an allocation of the limited fabric resource for each of the plurality of fabrics, and balancing utilization of the limited fabric resource across the plurality of fabrics using at least one processor based at least in part upon the determined fabric limits and determined allocations of the limited fabric resource for the plurality of fabrics, where balancing utilization of the limited fabric resource includes migrating at least one virtual machine that utilizes a first fabric among the plurality of fabrics to use a second fabric among the plurality of fabrics.

In some embodiments, the fabric includes a Fibre Channel switch, and wherein the fabric limit is an active Fabric Login (FLOGI) limit, an active Fabric Discovery (FDISC) limit, a zone limit, or a host limit, and in some embodiments, the limited fabric resource comprises a fabric login for a storage switch in the first fabric, and wherein the fabric limit comprises an active login limit of the storage switch. In some embodiments, determining the fabric limit comprises querying the storage switch to retrieve the fabric limit, in some embodiments, determining the allocation of the limited fabric resource comprises accessing the storage switch to retrieve a current allocation of fabric logins for the storage switch, and in some embodiments, determining the allocation of the limited fabric resource comprises tracking active fabric logins in the computing environment.

Some embodiments include determining an overcommitted fabric capacity for each of the plurality of fabrics from the fabric limits, where balancing utilization of the limited fabric resource across the plurality of fabrics is based at least in part on the determined overcommitted fabric capacity for each of the plurality of fabrics. In addition, in some embodiments, determining the overcommitted fabric capacity includes adjusting the fabric limit by a fabric overcommit ratio.

In some embodiments, migrating at least one virtual machine that utilizes a first fabric among the plurality of fabrics to use a second fabric among the plurality of fabrics includes, for a first virtual machine powering down the first virtual machine, reconfiguring the first virtual machine to utilize the second fabric instead of the first fabric, and powering up the first virtual machine such that the first virtual machine utilizes the second fabric instead of the first fabric. Further, in some embodiments, balancing utilization of the limited fabric resource across the plurality of fabrics further comprises migrating at least one virtual machine to an alternate storage access technology to free up fabric resources on at least one of the plurality of fabrics. In some embodiments, migrating the at least one virtual machine to the alternate storage access technology is based at least in part on the at least one virtual machine having a low priority, and in some embodiments, the fabric comprises a Fibre Channel-based network, and wherein the alternate storage access technology comprises vSCSI.

In some embodiments, determining the fabric limit, determining the allocation of the limited fabric resource, and balancing utilization of the limited fabric resource across the plurality of fabrics are performed periodically, while in some embodiments, determining the fabric limit, determining the allocation of the limited fabric resource, and balancing utilization of the limited fabric resource across the plurality of fabrics are performed in response to a virtual machine deployment operation performed when at least one fabric lacks capacity.

In addition, some embodiments include an apparatus with at least one processor and program code configured upon execution by the at least one processor to perform any of the aforementioned methods. Some embodiments also include a program product including a non-transitory computer readable medium and program code stored on the non-transitory computer readable medium and configured upon execution by at least one processor to perform any of the aforementioned methods.

Numerous variations and modifications will be apparent to one of ordinary skill in the art, as will become apparent from the description below. Therefore, the invention is not limited to the specific implementations discussed herein.

Hardware and Software Environment

Figure 1B:
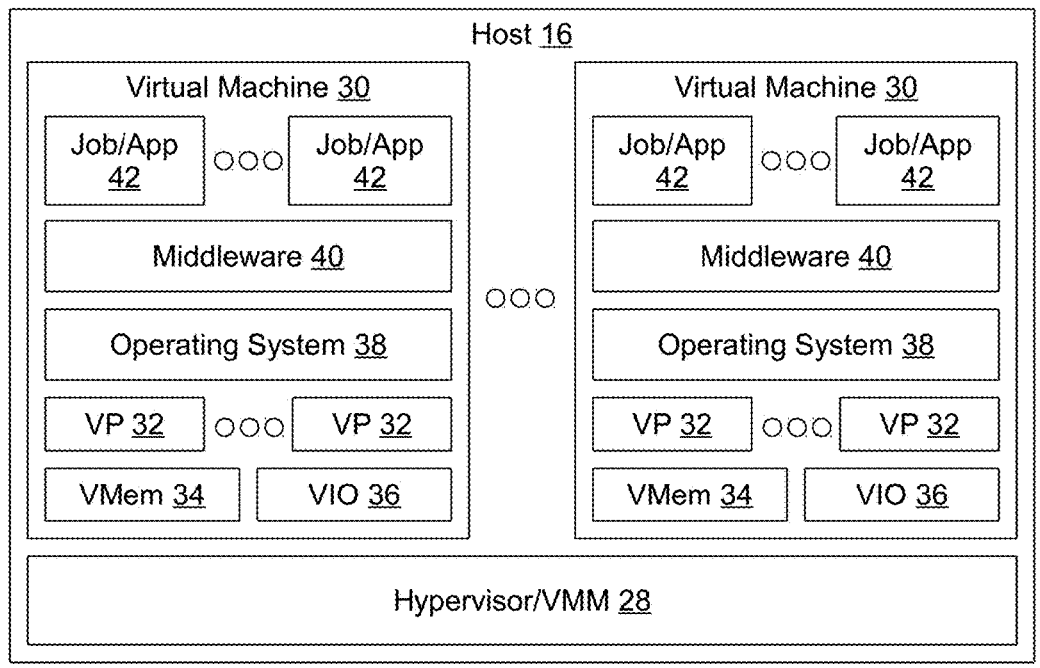

Turning to the Drawings, wherein like parts denote like numbers throughout the several views, FIGS. 1A-1B illustrate the principal hardware and software components in a virtualized computing environment or apparatus 10 consistent with the invention. As shown in FIG. 1A, apparatus 10 may include a multi-node data processing system 12 where the physical hardware is distributed among a plurality of physical processor nodes 14 disposed in a plurality of computer systems 16, with the computer systems 16 disposed in one or more pools 18. Each processor node 14 includes one or more processors 20, one or more memory devices 22, and in some embodiments, additional hardware such as input/output (I/O) hardware 24 (e.g., one or more input/output (I/O) adapters) and/or networking hardware 26. Appropriate networking functionality (not shown) may also be used to provide data communication between the various processor nodes 14 and computer systems 16, as well as other external systems.

Apparatus 10 may be implemented using any of a number of different architectures suitable for implementing a virtualized environment. For example, in one embodiment, apparatus 10 may include one or more of a Power 770, 780 or 795 system available from International Business Machines Corporation, the configuration of which will be apparent to one of ordinary skill in the art having the benefit of the instant disclosure. It will be appreciated, however, that other architectures suitable for executing virtualized environments may be used in other embodiments of the invention, so the invention is not limited to the particular architecture disclosed herein.

Each processor 20 may be implemented as a single or multi-threaded processor and/or as a single or multi-core processor, while each memory 22 may be considered to include one or more levels of memory devices, e.g., a DRAM-based main storage, as well as one or more levels of data, instruction and/or combination caches, with certain caches either serving individual processors or multiple processors as is well known in the art. In addition, the memory of apparatus 10 may be considered to include memory storage physically located elsewhere in apparatus 10, e.g., any cache memory in a processor, as well as any storage capacity used as a virtual memory, e.g., as stored on a mass storage device or on another computer coupled to apparatus 10.

Apparatus 10 operates under the control of one or more kernels, hypervisors, operating systems, etc., and executes or otherwise relies upon various computer software applications, components, programs, objects, modules, data structures, etc., as will be described in greater detail below. Moreover, various applications, components, programs, objects, modules, etc. may also execute on one or more processors in another computer coupled to apparatus 10 via network, e.g., in a distributed or client-server computing environment, whereby the processing required to implement the functions of a computer program may be allocated to multiple computers over a network.

For example, FIG. 1B illustrates various software components 28-42 that may be resident within a system 16 in apparatus 10. A hypervisor or virtual machine monitor (VMM) 28 may host one or more virtual machines (VMs) 30 and may allocate to each virtual machine 30 a portion of the physical hardware resources of system 16 (e.g., processor, memory and/or 10 resources associated with one or more processor nodes 14), represented here by one or more virtual processors (VPs) 32, a virtual memory (VMem) 34 and virtual input/output (VIO) resources 36. Each virtual machine 30 may in turn host an operating system 38 and optionally middleware 40, as well as one or more jobs and/or applications 42. It will be appreciated that each virtual machine 30, which may also be referred to as a logical partition, virtual server or virtual computer, may operate in a manner that emulates a separate physical computer, and as such, may host practically any software components capable of being hosted by a computer.

Additional hardware and/or software components may also be resident in apparatus 10, e.g., mass storage hardware, external input/output devices such as printers or displays, and management hardware and/or software, e.g., a hardware management console (HMC) through which the hardware and/or software configuration of the apparatus may be managed by an administrator. Further, in the illustrated embodiments, connectivity to one or more external networks 44 may also be supported, as may connectivity to one or more storage systems 46 through one or more storage fabrics 48. Virtualized environments may be implemented in an innumerable number of manners, and may include an innumerable number of hardware and/or software variations, and as such, the invention is not limited to the particular implementation disclosed herein.

It will be appreciated that the present invention may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIGS. 1A-1B is not intended to limit the present invention. Indeed, those skilled in the art will recognize that other alternative hardware and/or software environments may be used without departing from the scope of the invention.

Virtual Machine Management Based on Fabric Limit

When a server connects to a storage system in a Fiber Channel-based SAN, a fabric login (FLOGI) is generally performed on a fabric switch. A fabric login is conceptually similar to obtaining an IP address from a DHCP server. Similarly, when a virtual server connects to a storage system in a SAN, e.g., using N_Port ID Virtualization (NPIV), a login operation similar to a FLOGI and referred to as a Fabric Discovery (FDISC), may be performed. NPIV may be used, for example, to assign storage to virtual machines directly. Fabric switches may have limitations on the number of active FLOGIs and FDISCs, and generally the maximum number of active fabric logins (FLOGI and/or FDISC) is much less than the number of zone members the switch can handle. For example, some commercially-available fabric switches have a limit of 400 active FLOGIs or FDISC, despite supporting up to 16,000 zone members functioning as hosts or storage devices on the fabric. As such, a fabric switch generally may have many more hosts and storage devices configured to the switch than can be actively communicating through the switch at a given time.

When virtualization is employed, fabric limitations may present unique difficulties. In particular, in some applications, if a fabric switch active login limit (e.g., a limit on the number of active FLOGIs and/or FDISCs) is exceeded, a virtual machine may not be able to connect to a storage volume, and if the storage volume happens to be a boot disk, the virtual machine may fail when attempting to boot.

In some virtualized environments, virtual machine images are created to include logic to perform an initial sequence of operations when a virtual machine first boots. This initial sequence may perform operations such as assigning hostnames and IP addresses to the virtual machine and setting credentials. This sequence may be run once, and if it fails, it may not be run again. As a result, if a boot disk is not accessible to a virtual machine because a fabric active login limit or other fabric limit is exceeded, the virtual machine may be marked as an error. Generally, virtual machines are booted as a part of being created/deployed, and as a result, the FLOGI/FDISC limits of a switch may be considered to be a substantial constraint and cost factor for scaling the number of virtual machines in cloud environments with NPIV.

In some embodiments of the invention, therefore, fabric limits, e.g., the active fabric login limits of one or more switches in a fabric, may be used in the management of virtual machines. For example, in some embodiments, fabric limits may be used when determining where to place a virtual machine, e.g., on a particular host among a plurality of hosts that are capable of hosting the virtual machine. As such, in some embodiments, fabric limits may be used in connection with a process of filtering hosts for virtual machine placement, as well as in connection with a process of selecting an alternative fabric if the capacity of a first fabric is exceeded and/or a process of determining when a fabric has capacity for additional logins.

In some embodiments, fabric limits may also be used in connection with load balancing, e.g., to distribute limited fabric resources across multiple fabrics in a virtualized environment in such a manner that storage performance is balanced and fabric limits are obeyed. As such, in some embodiments, fabric limits may be used in connection with load balancing fabric use by migrating virtual machines from one fabric to another. In addition, in some embodiments fabric limits may be used in connection with a process of selecting an alternative storage attachment type (e.g., to use vSCSI instead of NPIV) if the capacity of all or some of the fabrics in a virtualized environment is exceeded and/or in connection with a process of load balancing fabric use by migrating virtual machines from NPIV connections to vSCSI connections (e.g., so that lower priority virtual machines are migrated from NPIV to vSCSI to free up active logins for higher priority virtual machines).

Moreover, in some embodiments, fabric limits may also be used in connection with the deployment and boot up of virtual machines to address the risks of virtual machine boot errors. For example, in some embodiments, fabric limits may be used in connection with a process of delaying the power-up of a virtual machine during the deployment of the virtual machine when the capacity of the fabric has been exceeded, and/or in connection with a process of specifying if a virtual machine should be booted when a data disk fabric has reached a fabric limit. As another example, in some embodiments, fabric limits may be used in connection with a process of scheduling the power-up of a virtual machine when additional capacity of a fabric becomes available and/or in connection with a process of prioritizing an order of virtual machines to be booted when additional capacity of a fabric becomes available.

Moreover, the invention may be used in some embodiments in connection with virtualized environments employed for cloud computing. Cloud computing often provides for cost efficiencies via elastic computing where resources are provisioned and de-provisioned based on workload changes. As resource requirements of workloads generally change over time, multiplexing cloud resources over multiple workloads often results in higher overall resource utilization. In addition, in order to be cost-efficient, a risk may be taken that not all workloads will run at their maximum resource requirements at the same time, such that fewer resources than the sum of all maximum resource requirements for workloads may be allocated, resulting in resources that are said to be "overcommitted." For example, a cloud provider may allocate more virtual CPUs across their virtual machines on a host assuming that some of the virtual machines only run at off-peak hours when other virtual machines are shut-down.

Resources may be overcommitted in some environments by using overcommit parameters referred to as overcommit ratios, which may be used to determine capacity by multiplying the amount of available resources by the ratio. For example, the processor capacity when the processor overcommit ratio is 4 for a system with 16 processor cores may be 4*16=64 virtual processors. Provisioning logic, e.g., filters, may then use the calculated capacity when determining if a virtual machine is capable of being deployed to a host.

In some embodiments of the invention, overcommit parameters such as overcommit ratios may also be used in connection with fabric limits, and thereby improve the capacity and optimize the utilization of a storage fabric and any storage system attached thereto. It should be noted that the concept of a limit, as used herein, is distinct from the concept of capacity. Within the context of this discussion, limit may be used to refer to an actual limit, e.g., a maximum number of active logins a fabric switch allows, whereas capacity may be used to refer to a limit after modification by an overcommit parameter, e.g., the number of active logins that are allowed by a fabric switch after taking into account an overcommit ratio. In some embodiments, fabric overcommit parameters may be defined for a fabric, for multiple fabrics, or for individual components in a fabric.

Moreover, it will be appreciated that different overcommit parameters may be optimal for different operating environments. For example, where a virtualized environment primarily hosts long-lived virtual machines, the benefits of overcommitting limited fabric resources may not be as great as in environments that primarily host short-lived virtual machines. Thus, for environments that primarily host short-lived virtual machines that are more likely to come and go over time, a higher overcommit ratio, for example, may be justified.

In one embodiment discussed in greater detail below, fabric limit-based virtual machine management may be used in connection with cloud/virtualization management software, e.g., OpenStack-based management software, and may use a configured overcommit ratio and information about fabric limits such as active login limits for one or more fabric switches to control the placement of virtual machines on one or more hosts attached to a storage fabric. Furthermore, in this embodiment, and with respect to an NPIV boot disk, the boot up of a virtual machine may be selectively delayed when a storage fabric determined to be overcommitted until a later time in which the active logins of the storage fabric drop below the active login limit.

In the illustrated embodiment, as part of the configuration of a fabric being managed by cloud/virtualization management software, an overcommit ratio may be specified for each fabric under management, representing a multiplier of a fabric's active login limit. For example, such functionality may be supported in cloud/virtualization management software such as the Power Virtualization Center (PowerVC) enterprise virtualization management software used for Power systems and based on the OpenStack framework, and available from International Business Machines.

Figure 2:
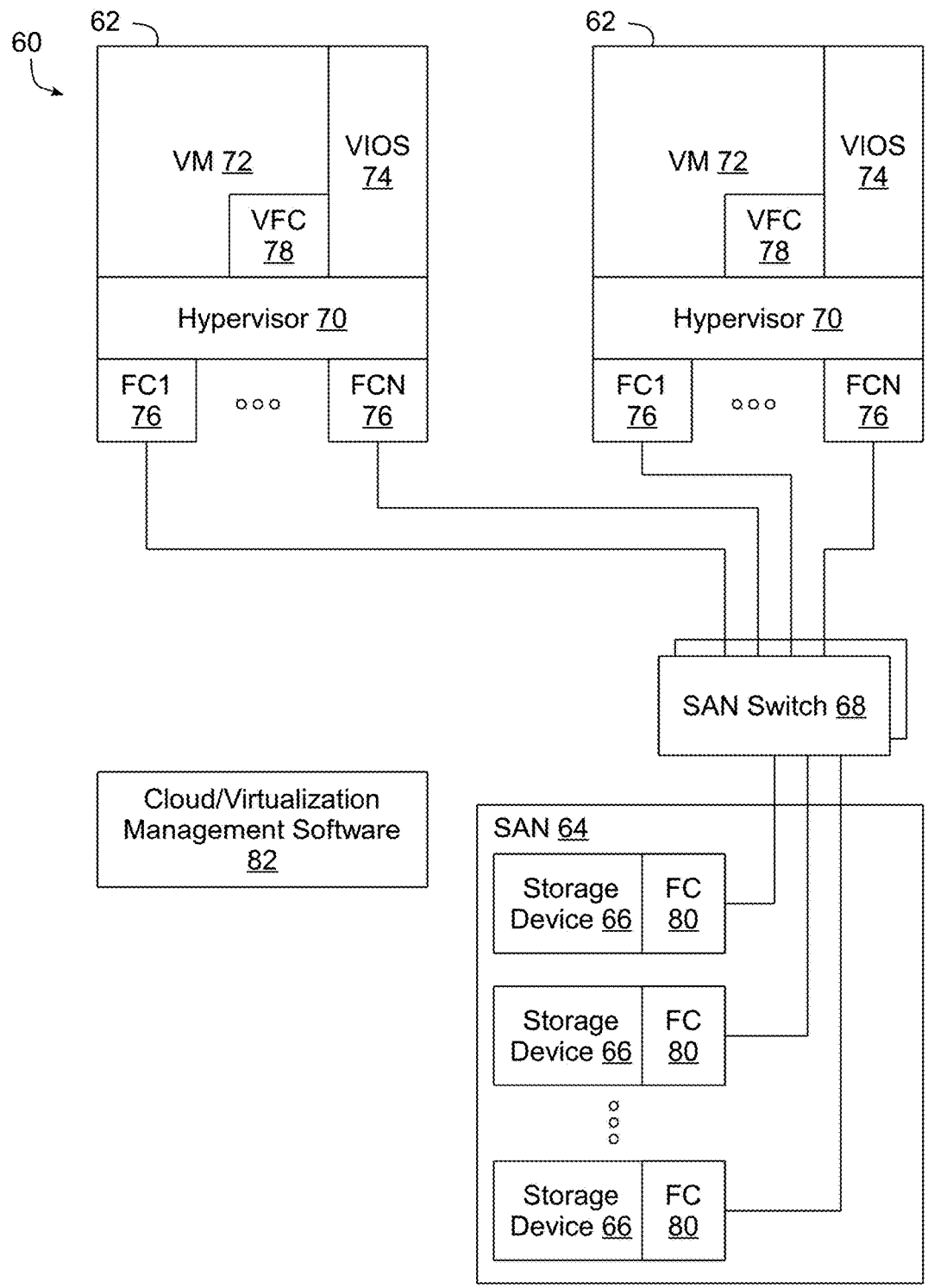
FIG. 2 is a block diagram of an example virtualized computing environment in which a plurality of hosts are coupled to a storage area network (SAN) through a Fibre Channel-based storage fabric.

FIG. 2, for example, illustrates an example virtualized environment 60 including a plurality of hosts 62 coupled to a Fibre Channel-based storage area network (SAN) 64 including a plurality of storage devices 66 coupled to the plurality of hosts 62 through one or more fabrics, represented by a plurality of SAN switches 68. It will be appreciated that SAN switches 68 may define a single fabric, or may define multiple fabrics that each interconnect all or a subset of hosts to all or a subset of storage devices. Moreover, in the illustrated embodiment, each SAN switch 68 has an active login limit representing a fabric limit of SAN 64.

Each host 62 includes a virtual machine manager or hypervisor 70 that manages one or more virtual machines (VMs) 72. One or more virtual input/output servers (VIOSs) 74 may also be supported in each host 62, and among other functions, each VIOS 74 may support virtualization of one or more physical I/O adapters, such as a plurality of Fibre Channel (FC) adapters 76 coupled to SAN switches 68. When virtualizing an FC adapter 76, one or more virtual Fibre Channel (VFC) adapters 78 may be created for access by a virtual machine 72, and it is through the VFC adapters 78 that a virtual machine 74 may effectively log in and connect to SAN 64 for accessing a storage device 66, which is likewise coupled to a SAN switch 68 through an FC adapter 80. It will be appreciated that in other embodiments, no VIOS may be used, and virtualization of adapters may be performed by other logic.

Management of virtualized environment 60 may be provided by cloud/virtualization management software 82, which is coupled to SAN 64 as well as each host 62. In some embodiments, a hardware management console (HMC) may also be used. In some embodiments, the functionality of cloud/virtualization management software 82 and/or an HMC may be allocated in part to other components in environment 60 (e.g., to a hypervisor 70, VIOS 74, etc.) and/or may be partitioned into other software components. Therefore, the invention is not limited to the particular allocation of functionality described herein.

Cloud/virtualization management software 82, e.g., PowerVC-compatible software in some embodiments, may be provided with fabric limits and/or overcommit parameters, and may also be configured to track or acquire information on current resource allocation for comparison against the fabric limits and/or capacities. For example, in some embodiments, fabric limits may be collected by using APIs provided by fabric switches (e.g., SAN switches 68), other fabric components and/or any other fabric management hardware and/or software. In another embodiment, a user may manually enter limits based upon documented limits provided by a component vendor. In addition, in some embodiments, current resource allocation may be collected by cloud/virtualization management software by querying fabric switches (e.g., SAN switches 68) and other fabric hardware and/or software components, while in other embodiments counts may be maintained by the software and incremented/decremented as virtual machines are powered-on and powered-off.

Using the limit information (e.g., active login fabric limits), current resource allocation information (e.g., active login counts) and an overcommit parameter (e.g., an overcommit ratio), the cloud/virtualization management software may filter out possible hosts and/or fabrics capable of being targets of a virtual machine deployment. For example, if a fabric A has an overcommit ratio of 2 and has a limit of 400 active fabric logins, the cloud/virtualization management software may not allow any virtual machines to be deployed to hosts on fabric A if the current count of active logins is 800. In addition, if fabric B has not reached capacity, hosts on that fabric may be considered by the cloud/virtualization management software to be candidates for the deployment.

In addition, in some embodiments, the cloud/virtualization management software may be configurable to specify for a virtual machine, whether the virtual machine should boot regardless of whether a fabric limit has been exceeded or if a disk is required, e.g., for NPIV attached data disks. Further, in some embodiments, an environment may be configurable to specify what, if any, other storage access technology may be used if a fabric is either at a fabric limit or at a capacity (e.g., to switch to using vSCSI if an NPIV fabric is at capacity).

Figure 3:
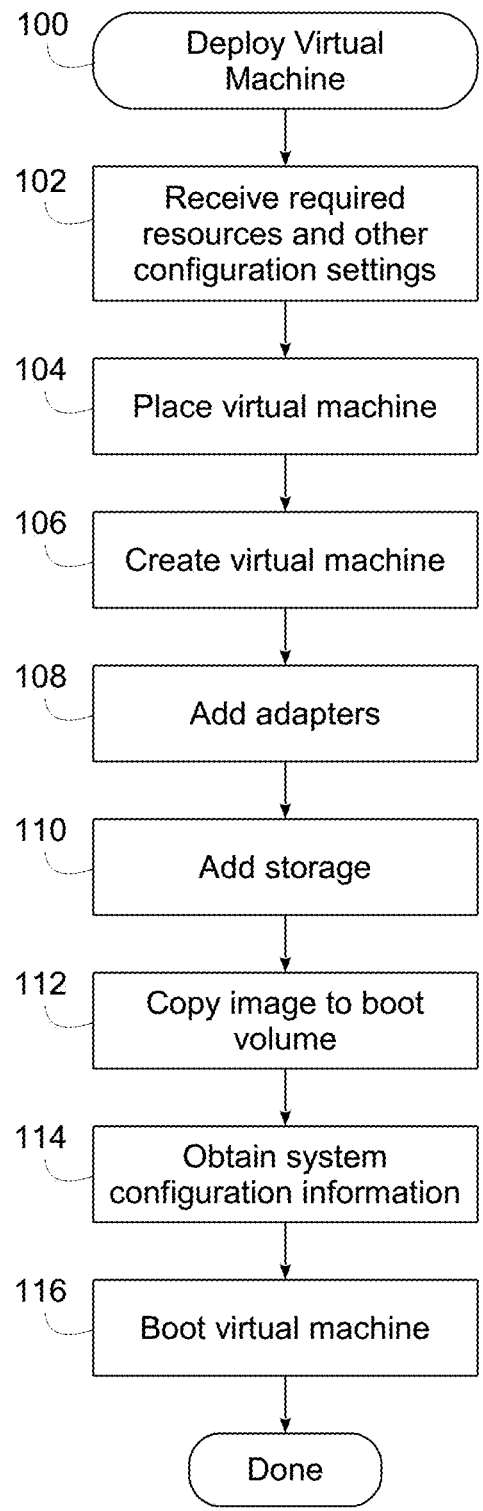
FIG. 3 is a flowchart illustrating an example deploy virtual machine routine that may be performed by the virtualized computing environment of FIG. 2.

Now turning to FIG. 3, a deploy virtual machine routine 100, capable of being executed in environment 60, is illustrated in greater detail. Routine 100 may be executed, for example, in response to an administrator request to deploy a new virtual machine to the environment, and may be performed, for example, in response to interaction via a graphical user interface, which may be run locally in environment or remotely in an external computer coupled to the environment.

Deployment of a virtual machine, in this context, refers to the creation and boot up/power on of a new virtual machine in environment 60, and as such, routine 100 begins in block 102 by receiving any required resources and/or other configuration settings for the virtual machine to be deployed. A user may specify, for example, a desired number of virtual processors, a desired amount of virtual memory, a desired amount of virtual storage, desired network and/or storage connections, etc., as well as settings such as performance tunings, virtual machine name, type of storage, number of storage disks or volumes, etc.

Next, in block 104, the virtual machine to be deployed is placed on a host, i.e., a host for the virtual machine is selected from a plurality of hosts in the virtualized environment. A host may selected based upon various factors, including compatibility with the virtual machine requirements and settings specified by the administrator as well as optimizing the overall performance of the virtualized environment by balancing workloads. A further discussion of one suitable virtual machine placement operation is discussed below in connection with FIG. 4.

Next, once a host is selected for the virtual machine, the virtual machine is created in block 106, e.g., by instructing virtual machine management functionality on the host to create a new virtual machine on that host. Next, in block 108, one or more virtual adapters may be added to the virtual machine, e.g., to create network and/or storage connectivity. In one embodiment, for example, virtual adapters such as one or more virtual Ethernet adapters and one or more virtual Fibre Channel adapters may be added. In some embodiments, blocks 106 and 108 may be implemented by software 82 of FIG. 2 instructing an HMC to create a virtual machine on a particular host and to create particular virtual adapters on the created virtual machine.

Next, in block 110, one or more virtual storage volumes may be added for the virtual machine. Software 82, for example, may create the volumes, communicate with a storage fabric to set up a zone and thereby provide a mechanism through which the virtual machine may communicate with storage. Then, in block 112, a virtual machine image is copied to the boot volume, e.g., from a collection of pre-stored images including the operating system and application(s) to execute in the virtual machine.

Block 114 next obtains system configuration information for the operating system of the virtual machine, e.g., information such as host name, IP address, etc. In some embodiments, for example, a virtual optical drive may be added to the virtual machine with the system configuration information provided on a virtual optical disc. In other embodiments, the system configuration information may be obtained in another manner, e.g., via a networked metadata service.

Then, in block 116, the virtual machine is booted, e.g., by software 82 instructing an HMC to boot the virtual machine. The virtual machine thereafter attempts to boot, and routine 100 is complete. Booting a virtual machine is analogous to powering on a physical computer and bringing it into a fully active state, and thus may be considered to incorporate the initialization and execution of program code of the virtual machine to bring the virtual machine into a fully active state. Moreover, the terms "booting" and "powering up" may be used interchangeably herein.

It will be appreciated that the deployment of virtual machines may be implemented in a number of different manners in different virtualized environments. As such, a number of different alternative processes may be used in other embodiments, as will be appreciated by one of ordinary skill in the art having the benefit of the instant disclosure.

Figure 4:
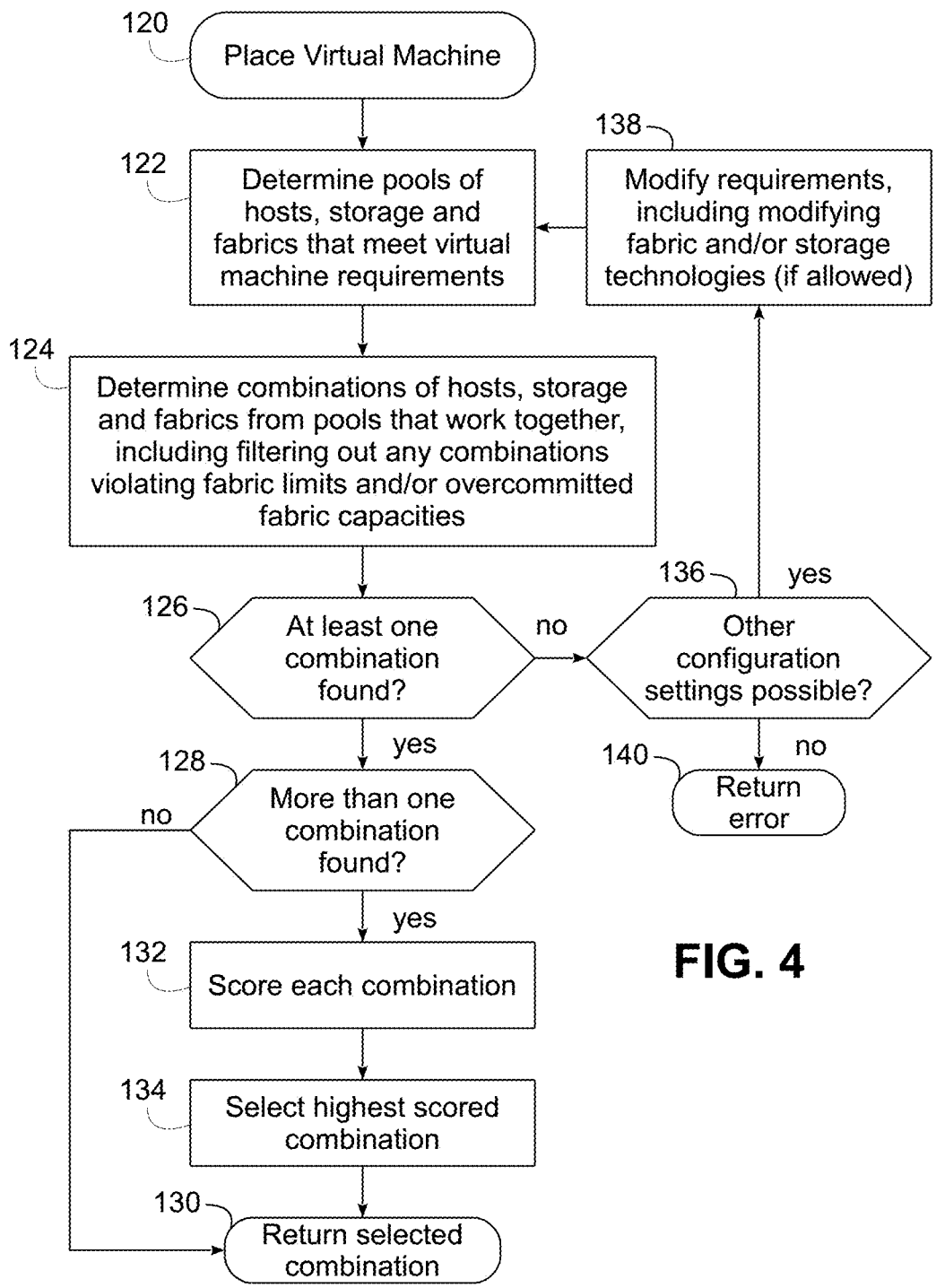
FIG. 4 is a flowchart illustrating an example implementation of the place virtual machine routine referenced in FIG. 3.

As noted above in connection with block 104, a virtual machine placement operation may be performed to select a host upon which to deploy the virtual machine. Furthermore, consistent with some embodiments of the invention, fabric limitations may be considered in a virtual machine placement operation. FIG. 4, for example, illustrates a place virtual machine routine 120 that may be used to implement block 104 of FIG. 3 in some embodiments of the invention.

Routine 120 begins in block 122 by determining pools of hosts, storage systems and fabrics that meet the requirements of the virtual machine to be deployed, e.g., based upon any particular storage, architectures, protocols, network resources, resource capacity requirements, etc. that the virtual machine will need in order to handle its workload. Next, block 124 determines candidate combinations of hosts, storage and fabrics from the pools that are compatible with one another and that have sufficient capacity to host the virtual machine. In determining whether a particular combination is a suitable candidate, block 124 may consider capacities/limits of hardware resources on a host, e.g., processor resources, memory resources, adapter resources, etc., and in some embodiments, overcommit ratios may be used in the determination of capacities of such hardware resources. Likewise, block 124 may consider capacities/limits of storage systems when determining whether a combination is a suitable candidate.

Moreover, in some embodiments, block 124 may consider fabric limits and/or capacities when determining whether a host/fabric/storage system combination is a suitable candidate. For example, active login limits of one or more fabric switches may be considered in the determination of a candidate combination, whereby if a fabric switch active login limit has been exceeded for a switch in a particular fabric, any combination incorporating the fabric may be excluded as a candidate.

In addition, in some embodiments an overcommit parameter, e.g., an overcommit ratio, may be used in determining whether a fabric has sufficient capacity. Thus, if a fabric switch has a limit of 400 active logins, and an overcommit ratio of 2 is specified for the fabric, the fabric will be considered to have sufficient capacity of the current number of active logins is less than 800.

Next, block 126 determines whether at least one candidate combination has been found. If so, block 128 determines whether more than one candidate combination has been found, and if only one candidate combination has been found, control passes to block 130 to return the single candidate combination as the combination selected by the placement operation.

If more than one candidate combination has been found, however, block 128 passes control to block 132 to score each candidate combination, and then to block 134 to select the highest scored candidate combination. Control then passes to block 130 to return the selected candidate combination.

When scoring candidate combinations, various factors may be considered, and various weights may be applied to those factors, in order to optimize the placement of a virtual machine within a virtualized environment. For example, various load balancing algorithms may be applied to place the virtual machine in order to balance workloads, to maximize performance, to minimize communication costs with other resources used by the virtual machine, to optimize power consumption in a data center (e.g., to locate virtual machines on a subset of hosts and enable other hosts to be powered down), to co-locate the virtual machine with other related virtual machines, to anti-collocate the virtual machine with other related virtual machines for disaster or high availability planning, etc. Moreover, in some embodiments consistent with the invention, fabric limits and/or capacities, whether or not based on an overcommit parameter, may also be considered when scoring candidate combinations.

Therefore, in some embodiments of the invention, a score S may be calculated for a combination in some embodiments as follows:

$$S = \sum_{i=1}^{n} f_i w_i$$

where $f_i$ is a factor among a total of n factors and $w_i$ is a weight to be applied to that factor, and where at least one factor $f_i$ is related to a fabric limit and/or fabric capacity.

Returning to block 126, if no candidate combinations are found, control passes to block 136 to determine whether other configuration settings are possible, e.g., to enable a virtual machine to potentially be deployed to any other combinations. If so, control passes to block 138 to modify one or more requirements of the virtual machine, and then to block 122 to determine pools of hosts, storage and fabrics that meet the updated virtual machine requirements, and attempt to identify one or more candidate combinations. If block 136 determines that no other configuration settings are possible, control is instead passed to block 140, whereby routine 120 returns with an error, indicating that no suitable combination was identified.

Returning to block 138, among other modifications that may be made to a virtual machine's requirements, some embodiments may include various fabric-related modifications. For example, in some embodiments, block 138 may select an alternate fabric and/or select an alternate storage attachment type or technology (e.g., selecting vSCSI instead of NPIV, connecting a SAN volume to a host and virtualizing the storage to the virtual machine using Virtio technology, etc.) In some embodiments, configuration preferences may be specified to prioritize one type of fabric or storage access technology over another, or to select one type of fabric or storage access technology only when another type of fabric or storage access technology is over capacity or otherwise unavailable.

As such, in some embodiments of the invention, fabric limits and/or capacity may be considered within a placement routine both when determining whether a fabric and/or a combination incorporating a fabric is a candidate for placement of a virtual machine, and when scoring a candidate combination. In each instance, a determination may generally be made of a fabric limit of one or more fabrics as well as of an allocation of a limited fabric resource with which the fabric limit is associated. Placement of a virtual machine on a host may therefore be conditioned on such determinations.

Returning again to FIG. 3, fabric limits may also be considered in connection with the boot up of a virtual machine in block 116, e.g., in order to delay power-up of a virtual machine during deployment if the capacity of a fabric has been exceeded. In some embodiments, for example, if an overcommit parameter is used to determine a capacity that exceeds the actual fabric limit (e.g., to provide a capacity of active fabric logins that exceeds the actual fabric login limit of a switch), a risk may exist that a boot volume coupled to the virtual machine over the fabric may not be accessible when the virtual machine is booted, resulting in a failure to boot. In some instances, a virtual machine image will perform an initial sequence of operations to assign hostnames and IP addresses, set credentials, and attempt to boot off the boot volume, and if the boot volume is inaccessible due to a fabric limit, the virtual machine may be marked as an error. Furthermore, in some instances, manual intervention may be required to attempt a reboot in the event of a failure of a virtual machine to boot, and as such, additional administrative overhead may be required to ensure a virtual machine properly boots.

In some embodiments consistent with the invention, on the other hand, a fabric limit may be checked prior to booting a virtual machine to determine whether a fabric has sufficient capacity to boot the virtual machine, and if not, delay the boot of the virtual machine. As such, the virtual machine will have been created on the host, but will not be booted up until sufficient capacity exists.

In some embodiments, a virtual machine for which a boot has been delayed may be queued, e.g., in a first-in-first-out (FIFO) queue, and the virtual machine may later be booted once sufficient capacity exists on the fabric. Once the sufficient capacity is found to exist, the virtual machine may then be dequeued from the queue and booted on the host. A monitor process may be used in some embodiments to determine when a delayed virtual machine is capable of being booted, and then initiating the actual boot up of the virtual machine.

In some embodiments, a virtual machines may be dequeued from the queue in a FIFO basis, while in other embodiments, virtual machines may be prioritized, e.g., by setting a priority on each virtual machine in connection with creating and/or deploying the virtual machine, such that virtual machines with higher priorities will be booted before virtual machines having lower priorities. Further, in some embodiments, if a configuration setting for a virtual machine specifies an alternative storage access technology for one or more volumes, the deploy may attach the volume(s) with the alternative storage access technology based on the configuration setting and whether the active fabric logins are at the limit or capacity.

Figure 5:
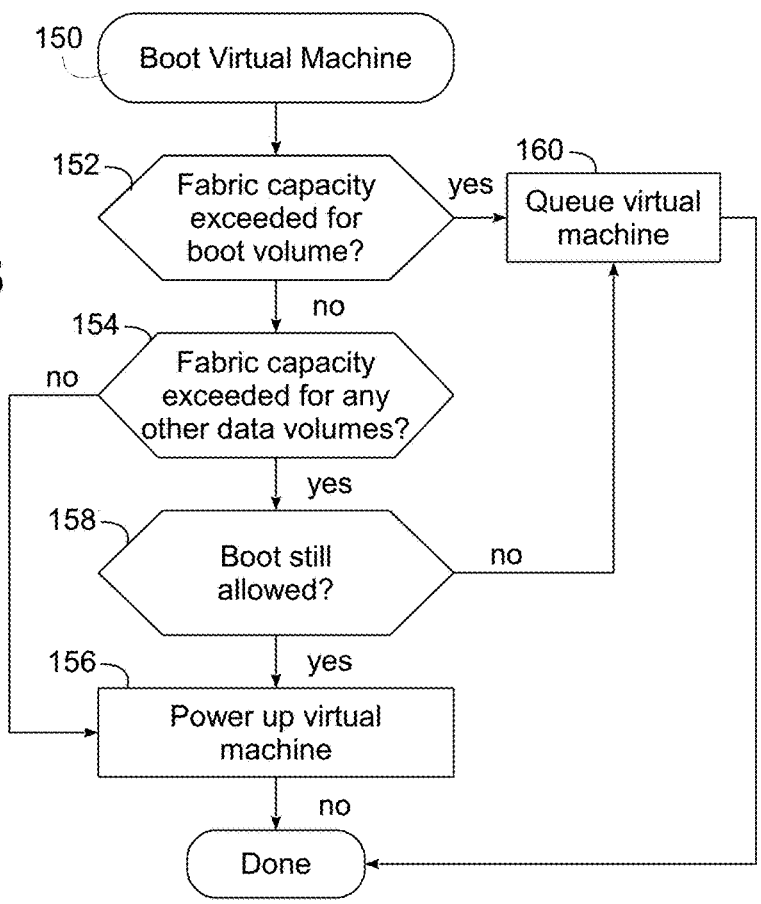
FIG. 5 is a flowchart illustrating an example implementation of the boot virtual machine routine referenced in FIG. 3.

FIG. 5, for example, illustrates an implementation of block 116 of FIG. 3 as a boot virtual machine routine 150.

Routine 150 is executed in response to a request or instruction to boot the virtual machine, and begins in block 152 by determining whether a fabric capacity has been exceeded for the boot volume of the virtual machine, i.e., whether sufficient capacity exists in the fabric to enable the virtual machine to connect to the boot volume through the fabric. The capacity, in this regard, may be based upon an actual fabric limit in some embodiments, so a determination of whether sufficient capacity exists may be based upon a comparison of an actual fabric limit and a current allocation of the limited fabric resource with which the fabric limit is associated, e.g., by a comparison of an active login limit for a fabric switch with a current number of active logins for that fabric switch.

If the fabric capacity is not exceeded for the boot volume, block 152 passes control to block 154 to similarly determine whether the fabric capacity has been exceeded for any other data volume for the virtual machine. If not, control passes to block 156 to boot/power up the virtual machine, e.g., by signaling an HMC to boot the virtual machine, and routine 150 is complete.

Returning to block 154, if the fabric capacity for any data volume for the virtual machine is exceeded, control passes to block 158 to determining whether the virtual machine is still permitted to boot. In some embodiments, for example, it may be desirable to permit a virtual machine that has access to a boot volume to boot irrespective of whether any other data volume is accessible. Furthermore, in some embodiments, it may be desirable to provide a configurable setting that specifies whether a virtual machine is able to boot in the absence of access to a data volume. As such, if a boot is still allowed, block 158 passes control to block 156 to power up the virtual machine.

On the other hand, if the fabric capacity is determined to be exceeded for the boot volume in block 152, or if the fabric capacity is determined to be exceeded for a data volume and the virtual machine is not permitted to boot in blocks 154 and 158, control passes to block 160 to queue the virtual machine on a queue associated with the fabric, and routine 150 is complete.

Figure 6:
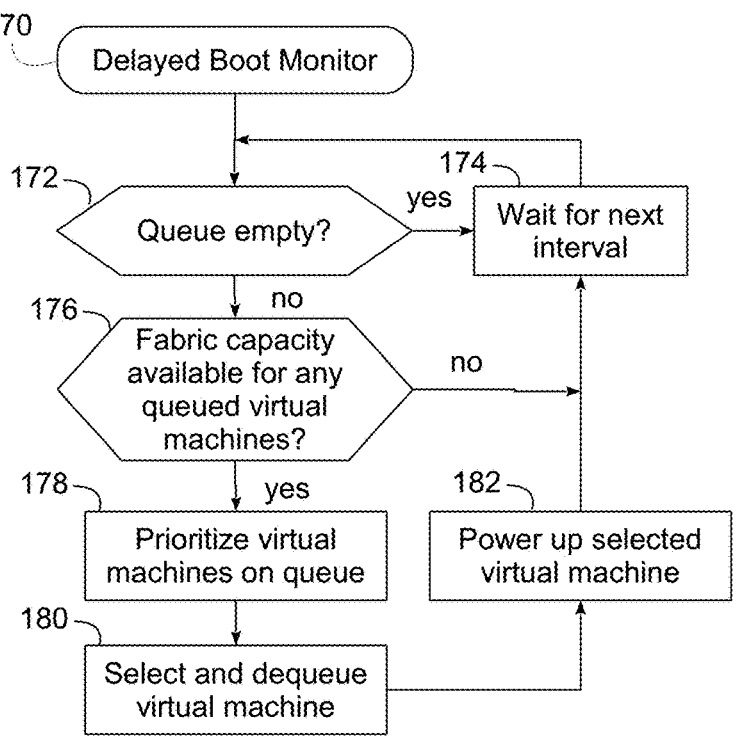
FIG. 6 is a flowchart illustrating an example delayed boot monitor routine that may be performed by the virtualized computing environment of FIG. 2.

Now turning to FIG. 6, a delayed boot monitor routine 170 is illustrated. Routine 170 may be executed in a background or persistent process, and may monitor the queue upon which virtual machines are enqueued by routine 150 of FIG. 5. Routine 170 may begin in block 172 by determining whether the queue is empty, and if it is, control passes to block 174 to wait for a next monitoring interval, after which control returns to block 172 to again check the status of the queue.

If, however, one or more virtual machines are enqueued on the queue, block 172 passes control to block 176 to determine whether, for any virtual machine on the queue, sufficient fabric capacity is available on any necessary fabric in order to boot the virtual machine. If not, block 176 passes control to block 174 to wait for the next monitoring interval.

However, if sufficient fabric capacity does exist for any virtual machine to boot, block 176 passes control to bock 178 to prioritize the virtual machines on the queue, or in some embodiments, only the virtual machines capable of being booted based upon a fabric's available capacity. The priorities may be based upon a configuration setting associated with each virtual machine, or based on other factors such as virtual machine type or other characteristic of a virtual machine, host, fabric, storage system, etc. In other embodiments, however, virtual machines may be ordered in a first in-first out (FIFO) manner.

Next, in block 180, one or more virtual machines are selected and dequeued from the queue based upon the order determined in block 178, and then in block 182, the selected virtual machine or machines are powered up. Control then returns to block 174 to wait for a next monitoring interval.

Fabric limits may also be used in some embodiments in connection with load balancing across fabrics. In particular, in some embodiments, more than one fabric may be used for a given host and storage system combination by configuring multiple ports. Cloud/virtualization management software consistent with the invention may use the currently active logins and active login limits of a plurality of fabrics and provision virtual machines to use fabrics that either haven't reached their limit or that have the most remaining capacity. In addition, in some embodiments ongoing monitoring of a fabric and load balancing of a fabric may be performing by powering down one or more virtual machines, reassigning the virtual machines to other fabrics, and powering the virtual machines back up to use the other fabrics. In addition, in some embodiments, if a configuration setting for a virtual machine specifies an alternative storage access technology (e.g., vSCSI instead of NPIV), storage for that virtual machine may be migrated to the alternative storage access technology to free up additional fabric resources. It may even be desirable in some embodiments to migrate one or more lower priority virtual machines to alternate storage access technologies to free up additional fabric resources for higher priority virtual machines.

Figure 7:
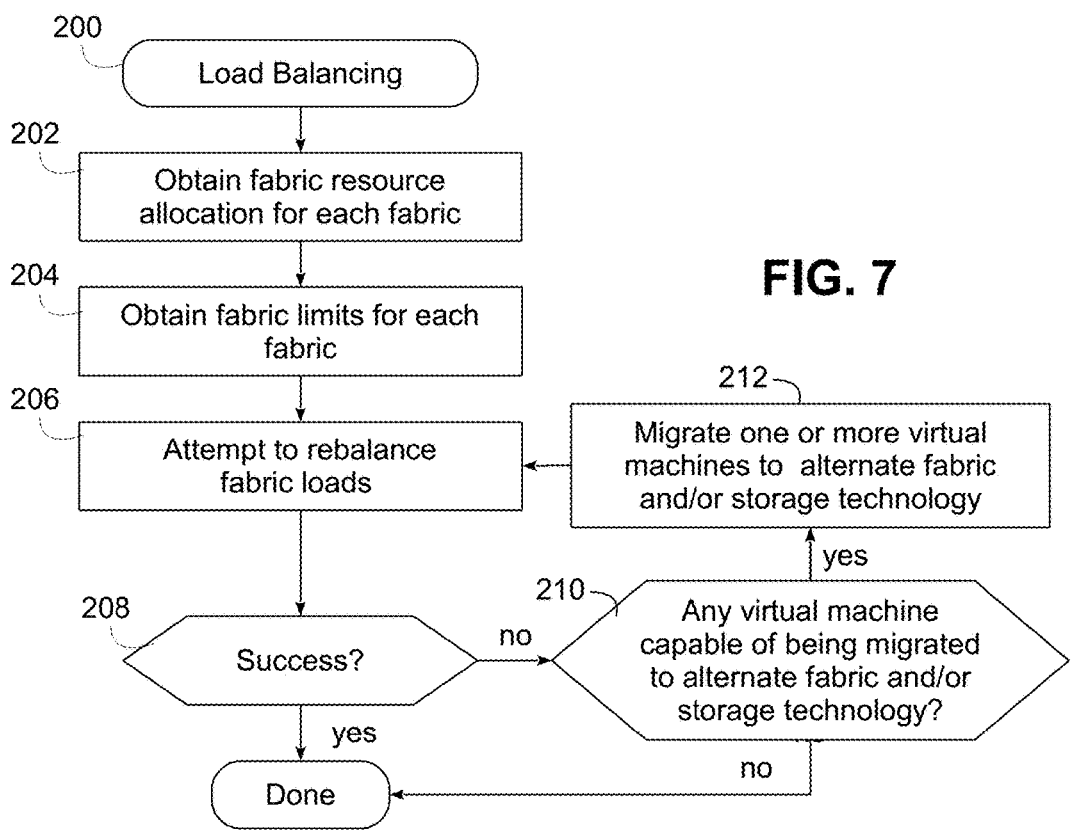
FIG. 7 is a flowchart illustrating an example load balancing routine that may be performed by the virtualized computing environment of FIG. 2.

FIG. 7, for example, illustrates a load balancing routine 200 that may be executed, for example, on a periodic basis, in response to a request to balance loads, in response to detecting a sub-optimal load balanced, etc. Routine 200 may also be executed in connection with a virtual machine deployment, e.g., if a particular fabric needed by a virtual machine being deployed is unavailable for use by that virtual machine. Routine 200 begins in block 202 by obtaining fabric resource allocation for each fabric over which to balance load. For example, the fabric resource allocation in some embodiments may relate to the current active logins for the switches in each fabric. Block 204 then obtains fabric limits for each fabric, e.g., the active login limits for each switch in each fabric. In addition, in some embodiments, an overcommit parameter such as an overcommit ratio may be used in adjusting the determined fabric limits and thereby determining an overcommitted capacity for each fabric.

Block 206 next attempts to rebalance the load across the fabrics, e.g., by migrating one or more virtual machines to a different fabric by selecting one or more virtual machines to be powered down, reconfigured to use a different fabric, and powered back up. Various load balancing algorithms may be used to rebalance the load, and various factors, e.g., virtual machine priorities, fabric requirements of particular virtual machines, etc., may be used in connection with such algorithms, as will be appreciated by those of ordinary skill in the art having the benefit of the instant disclosure.

Block 208 next determines whether the load balancing operation was success, based upon any of a number of different metrics. If so, routine 200 is complete. If not, however, control passes to block 210 to determine whether any virtual machine is capable of being migrated to an alternative fabric and/or storage technology, e.g., to a different storage access technology such as vSCSI instead of NPIV. Such a determination may be based, for example, on whether any virtual machine has a configuration setting that specifies that an alternate technology may be used for that virtual machine.

If no suitably-configured virtual machine exists, block 210 terminates routine 200. If so, however, block 210 passes control to block 212 to migrate one or more virtual machines to alternate fabric and/or storage technologies, e.g., using logic to unmap the storage, drop the zoning, and remove any associated adapters, and then proceed through operations similar to those used during deployment to add adapters and storage and map and zone the storage, as will be appreciated by one of ordinary skill in the art having the benefit of the instant disclosure. Control then passes to block 206 to attempt to rebalance the fabric loads with the one or more virtual machines migrated to the alternate technologies.

It will therefore be appreciated that fabric limits may be used in a number of aspects of a virtualized computing environment to optimize the performance of one or more virtual machines coupled to one or more storage systems through one or more fabrics. Various modifications may be made to the illustrated embodiments consistent with the invention. Therefore, the invention lies in the claims hereinafter appended.

What is claimed is:

1. An apparatus, comprising:
   at least one processor; and
   program code configured upon execution by the at least one processor to load balance in a computing environment of the type including a plurality of fabrics coupling a plurality of hosts to one or more storage systems, each fabric among the plurality of fabrics coupling one or more of the plurality of hosts to one or more of the one or more storage systems, the program code configured to:
   determine a fabric limit for a limited fabric resource of each of the plurality of fabrics, wherein the limited fabric resource for each respective fabric among the plurality of fabrics relates to a relative load and/or capacity of the respective fabric, and wherein the fabric limit is an active login limit, an active discovery limit, a zone limit, or a host limit;
   determine an overcommitted fabric capacity for each of the plurality of fabrics from the fabric limits;
   determine an allocation of the limited fabric resource for each of the plurality of fabrics; and
   balance utilization of the limited fabric resource across the plurality of fabrics based at least in part upon the determined fabric limits and determined allocations of the limited fabric resource for the plurality of fabrics, wherein the program code is configured to balance utilization of the limited fabric resource by migrating at least one virtual machine that is resident on a first host among the plurality of hosts and that utilizes a first fabric among the plurality of fabrics to use a second fabric among the plurality of fabrics, wherein the at least one virtual machine that is migrated to use the second fabric remains resident on the first host after migration, wherein the program code is configured to balance utilization of the limited fabric resource across the plurality of fabrics based at least in part on the determined overcommitted fabric capacity for each of the plurality of fabrics, and wherein the program code is configured to migrate at least one virtual machine by, for a first virtual machine:
   powering down the first virtual machine;
   reconfiguring the first virtual machine to utilize the second fabric instead of the first fabric; and
   powering up the first virtual machine such that the first virtual machine utilizes the second fabric instead of the first fabric.

2. The apparatus of claim 1, wherein the limited fabric resource comprises a fabric login for a storage switch in the first fabric, and wherein the fabric limit comprises an active login limit of the storage switch.

3. The apparatus of claim 1, wherein the program code is configured to balance utilization of the limited fabric resource across the plurality of fabrics further by migrating at least one virtual machine to an alternate storage access technology to free up fabric resources on at least one of the plurality of fabrics.

4. The apparatus of claim 3, wherein the program code is configured to migrate the at least one virtual machine to the alternate storage access technology based at least in part on the at least one virtual machine having a low priority.

5. A program product, comprising:
   a non-transitory computer readable medium; and
   program code stored on the non-transitory computer readable medium and configured upon execution by at least one processor to load balance in a computing environment of the type including a plurality of fabrics coupling a plurality of hosts to one or more storage systems, each fabric among the plurality of fabrics coupling one or more of the plurality of hosts to one or more of the one or more storage systems, by determining a fabric limit for a limited fabric resource of each of the plurality of fabrics, determining an overcommitted fabric capacity for each of the plurality of fabrics from the fabric limits, determining an allocation of the limited fabric resource for each of the plurality of fabrics, and balancing utilization of the limited fabric resource across the plurality of fabrics based at least in part upon the determined fabric limits and determined allocations of the limited fabric resource for the plurality of fabrics, wherein balancing utilization of the limited fabric resource includes migrating at least one virtual machine that is resident on a first host among the plurality of hosts and that utilizes a first fabric among the plurality of fabrics to use a second fabric among the plurality of fabrics, wherein the at least one virtual machine that is migrated to use the second fabric remains resident on the first host after migration, wherein the fabric limit is an active login limit, an active discovery limit, a zone limit, or a host limit, wherein the limited fabric resource for each respective fabric among the plurality of fabrics relates to a relative load and/or capacity of the respective fabric, wherein balancing utilization of the limited fabric resource across the plurality of fabrics is based at least in part on the determined overcommitted fabric capacity for each of the plurality of fabrics, and wherein migrating at least one virtual machine includes, for a first virtual machine:
   powering down the first virtual machine;
   reconfiguring the first virtual machine to utilize the second fabric instead of the first fabric; and
   powering up the first virtual machine such that the first virtual machine utilizes the second fabric instead of the first fabric.

6. The apparatus of claim 1, wherein the fabric includes a Fibre Channel switch, and wherein the fabric limit is an active Fabric Login (FLOGI) limit or an active Fabric Discovery (FDISC) limit.

7. The apparatus of claim 2, wherein the program code is configured to determine the fabric limit by querying the storage switch to retrieve the fabric limit.

8. The apparatus of claim 2, wherein the program code is configured to the allocation of the limited fabric resource by accessing the storage switch to retrieve a current allocation of fabric logins for the storage switch.

9. The apparatus of claim 2, wherein the program code is configured to the allocation of the limited fabric resource by tracking active fabric logins in the computing environment.

10. The apparatus of claim 1, wherein the program code is configured to determine the overcommitted fabric capacity by adjusting the fabric limit by a fabric overcommit ratio.

11. The apparatus of claim 3, wherein the fabric comprises a Fibre Channel-based network, and wherein the alternate storage access technology comprises vSCSI.

12. The apparatus of claim 1, wherein the program code is configured to determine the fabric limit, determine the allocation of the limited fabric resource, and balance utilization of the limited fabric resource across the plurality of fabrics periodically.

13. The apparatus of claim 1, wherein the program code is configured to determine the fabric limit, determine the allocation of the limited fabric resource, and balance utilization of the limited fabric resource across the plurality of fabrics in response to a virtual machine deployment operation performed when at least one fabric lacks capacity.

14. The program product of claim 5, wherein the limited fabric resource comprises a fabric login for a storage switch in the first fabric, and wherein the fabric limit comprises an active login limit of the storage switch.

15. The program product of claim 5, wherein the program code is configured to balance utilization of the limited fabric resource across the plurality of fabrics further by migrating at least one virtual machine to an alternate storage access technology to free up fabric resources on at least one of the plurality of fabrics.

16. The program product of claim 15, wherein the program code is configured to migrate the at least one virtual machine to the alternate storage access technology based at least in part on the at least one virtual machine having a low priority.

* * * * *